United States Patent [19]

Yana et al.

[11] Patent Number: 5,009,527
[45] Date of Patent: Apr. 23, 1991

[54] THERMAL TRANSFER COLOR PRINTER WITH SHEET RETAINING AND GUIDING STRUCTURE ADJACENT PLATEN

[75] Inventors: Masasumi Yana, Hitoshi Nagato, both of Yokohama; Kiyoshi Yamada, Tokyo; Shyoji Ueno, Kunihiro Shibuya, both of Yokohama, all of Japan

[73] Assignee: Tokyo Shibaura Denki Kabushiki Kaisha, Kanagawa, Japan

[21] Appl. No.: 834,650

[22] Filed: Mar. 3, 1986

Related U.S. Application Data

[63] Continuation of Ser. No. 742,850, Jun. 10, 1985, abandoned, which is a continuation of Ser. No. 554,319, Nov. 22, 1983, abandoned.

[30] Foreign Application Priority Data

Nov. 24, 1982 [JP] Japan ................................ 57-204526

[51] Int. Cl.$^5$ .................... B41J 2/325; B41J 35/16; B41J 13/036
[52] U.S. Cl. ................. 400/120; 400/240.3; 400/625; 400/636.1; 346/76 PH
[58] Field of Search ................. 400/120, 240.3, 551, 400/568, 618, 624, 625, 629, 637, 637.1, 636.1; 271/229, 230, 231, 273, 274, 257, 3.1, 4, 902, 186; 346/76 PH; 219/216 PH

[56] References Cited

U.S. PATENT DOCUMENTS

| | | |
|---|---|---|
| 2,528,420 | 10/1950 | Carroll et al. .................. 400/625 |
| 3,586,149 | 6/1971 | Miller ............................ 400/618 |
| 4,250,511 | 2/1981 | Stein et al. .................. 346/76 PH |
| 4,348,118 | 9/1982 | Stafvenstedt et al. ......... 400/618 X |
| 4,359,217 | 11/1982 | Roller et al. .................. 271/902 X |
| 4,404,568 | 9/1983 | Kikuchi et al. .............. 346/76 PH |
| 4,422,376 | 12/1983 | Teraoka ...................... 400/120 X |
| 4,552,470 | 11/1985 | Yana et al. .................... 400/120 |

FOREIGN PATENT DOCUMENTS

174276 10/1982 Japan ................................ 400/120

Primary Examiner—Clifford D. Crowder
Attorney, Agent, or Firm—Banner, Birch, McKie & Beckett

[57] ABSTRACT

A thermal transfer color printer for printing color images on individual sheets of paper. One sheet of paper at a time is removed from a stack of paper stored in a cassette and this sheet is transported by a reversible platen roller in a first or forward direction at a first predetermined rate. While the sheet of paper is gripped between the reversible platen roller and one or more pinch rollers, slack is removed by a slack removing device. A multicolored ink ribbon with successively arranged color segments also is transported in the first direction at the same predetermined rate. A thermal printhead presses against the reversible platen roller to press the ink ribbon and sheet of paper together as they move in the first direction. Energization of the thermal elements on the thermal printhead by color component signals corresponding to the current color of the ink ribbon causes the particular current color to be thermally and selectively transferred to the sheet of paper. The thermal printhead then disengages the platen roller and the sheet of paper is transported in a set distance in a second direction opposite the first direction, and at a second predetermined rate, in order to repeat the process of thermally transferring other colors to the sheet of paper. During the back and forth movement of the sheet of paper, the reversible platen roller and the pinch rollers continuously grip the sheet of paper in order to precisely control the position of the sheet of paper to thereby avoid distortion. A complete color image is formed on the sheet of paper by superimposing the multiple colors of the ink ribbon as the sheet of paper and the different colors of the ink ribbon repeatedly move past the selectively energized thermal elements of the thermal printhead.

3 Claims, 14 Drawing Sheets

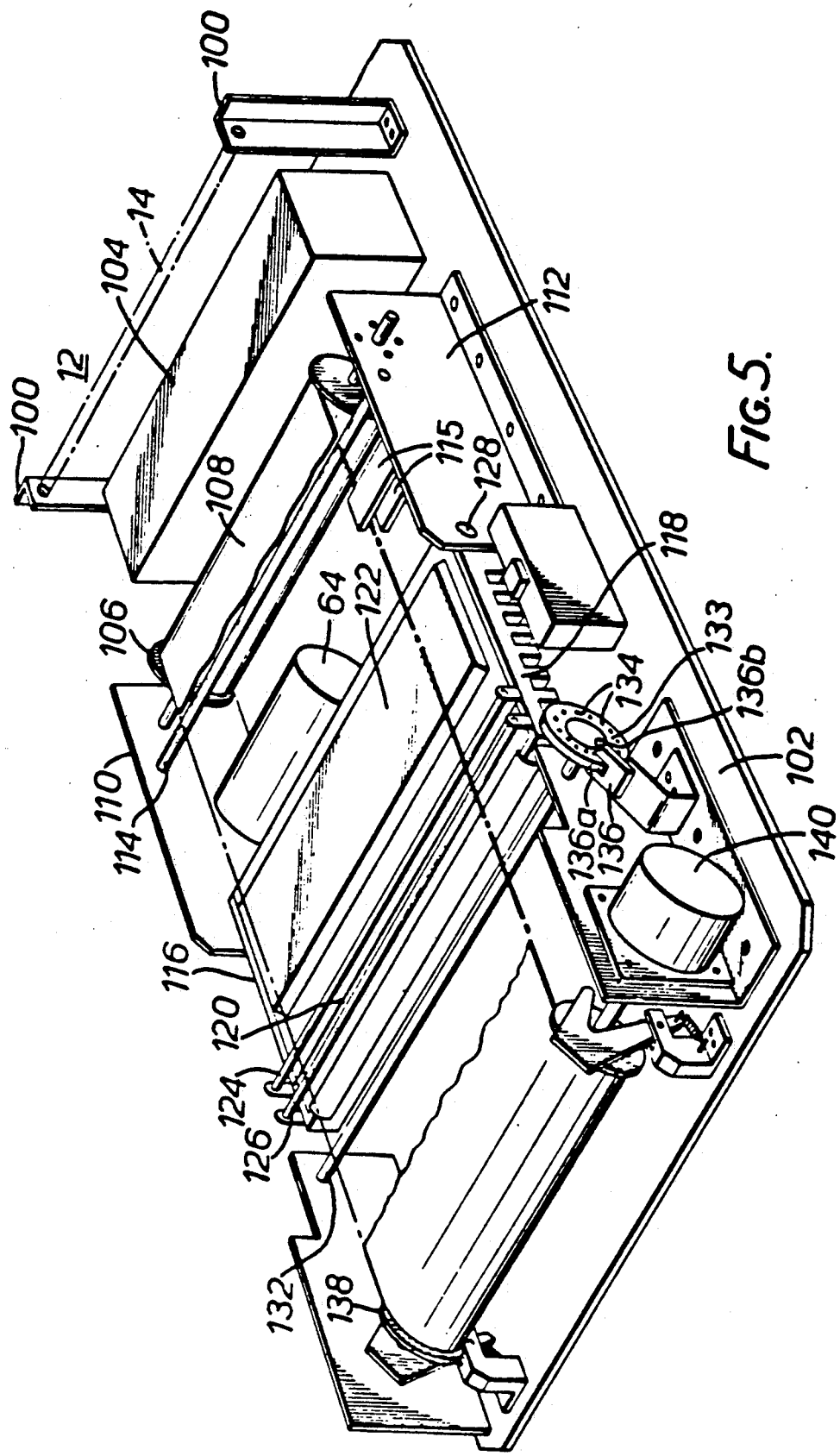

THERMAL TRANSFER COLOR PRINTER WITH SHEET RETAINING AND GUIDING STRUCTURE ADJACENT PLATEN

This application is a continuation of application Ser. No. 742,850, filed Jun. 10, 1985 which was a continuation of application Ser. No. 554,319, filed Nov. 22, 1983, both now abandoned.

BACKGROUND OF THE INVENTION

The present invention relates to a thermal transfer color printer, and in particular, to a thermal transfer color printer for printing images on a record medium in the form of sheets of paper.

Thermal transfer color printers have been proposed in which colored ink is selectively transferred from a carrier sheet, such as an ink ribbon, to a recording medium (e.g., plain paper or the like) by applying thermal energy to localized areas on the carrier. For example, Japanese Published Patent Application No. 57-174276 discloses a printing system in which a multicolored ink ribbon having nearly the same width as the recording paper is used. Each color area of the ink ribbon is at least as large as the entire area of the picture to be printed and the different color areas are alternately and successively arranged along the length of the ink ribbon. A thermal printhead applies thermal energy to localized areas on the ink ribbon for transferring the colored ink onto the recording paper. In operation, the thermal printhead prints a color image by receiving signals for the various color components in succession. When the first color component signals are received, the corresponding color area of the ink ribbon is advanced by one picture length in synchronization with the advancement of the recording paper. The recording paper then is transported in the reverse or backward direction by one picture length while the ink ribbon is in position to print the next color area. The second color component signals then are received by the thermal printhead and the ink ribbon and recording paper are again advanced by one picture length. Depending on the number of color components, the recording paper is repeatedly transported backward for printing additional color components. The color components are superimposed in the same area of the recording paper to complete the printing of the color image.

Though the above thermal transfer color printer is effective in printing a color image, it has a significant disadvantage if long paper in the form of a roll must be utilized as the recording medium. As a result, color printing on separate sheets of plain paper is not possible.

SUMMARY OF THE INVENTION

It is therefore an object of the present invention to provide an improved thermal transfer color printer which is capable of printing color pictures on a record medium in the form of cut sheets of plain paper having a predetermined size.

It is another object of the present invention to provide an improved thermal transfer color printer having a simple and inexpensive construction and which is capable of reproducing multiple color pictures on separate sheets of paper with high quality and resolution.

According to the invention, a thermal color printer is provided with a paper cassette or container for storing a recording medium in the form of separate sheets of paper which are removed from the container one by one and transported toward a platen roller through an entry guide. The platen roller can be rotated clockwise and counter clockwise by a drive motor. A paper sheet removed from the paper container is transported by the platen roller and a first pinch roller or an entry pinch roller provided adjacent to the platen roller in a first direction along the surface of the platen roller. The paper sheet then passes between the platen roller and a second pinch roller or an exit pinch roller which is also provided adjacent to the platen roller at the opposite side from the first pinch roller. The thermal color printer is provided with an ink carrier sheet or ink ribbon having various transferable colored ink areas alternately and successively arranged along its length. Each of the colored ink areas has a width at least as wide as a color picture image to be printed. The colored ink ribbon is transported along the surface of the platen roller over the paper sheet in the same first direction as the paper sheet by a carrier drive mechanism. A thermal printhead is provided on the surface of the platen roller. The thermal printhead has a row of thermal elements, each of which may be energized to transfer a colored ink onto the paper sheet as the ink ribbon moves over the printhead. The printhead selectively contacts the ink ribbon and the paper sheet on the surface of the platen roller as the ink ribbon and paper sheet advance at the same rate along the surface of the platen roller. Electrical signals for a particular color component are supplied to the printhead to selectively energize the thermal elements so that they transfer a corresponding first colored ink onto the paper sheet as the ink ribbon and paper sheet are advanced in the first direction by one picture length. The platen roller also transports the paper sheet in a second direction opposite the first direction by a distance equal to one color length while the printhead is disengaged from the surface of the platen roller. Electrical signals for a second color component are supplied to the printhead to transfer a corresponding second colored ink onto the paper sheet while the paper sheet and the ink ribbon are transported in the first direction. The above printing cycle is repeated for each color component until all color components are printed. During each printing cycle, the paper sheet is moved forward by platen roller and the first pinch roller at the entrance side of the platen roller and backward by the platen roller and the second pinch roller at the exit side. As a result, color patterns for different colored inks are superimposed on the paper sheet to create a color image.

BRIEF DESCRIPTION OF THE DRAWINGS

FIG. 5 is a perspective view showing the lower bracket of FIG. 1.

DETAILED DESCRIPTION OF THE PREFERRED EMBODIMENTS

Figure 1:
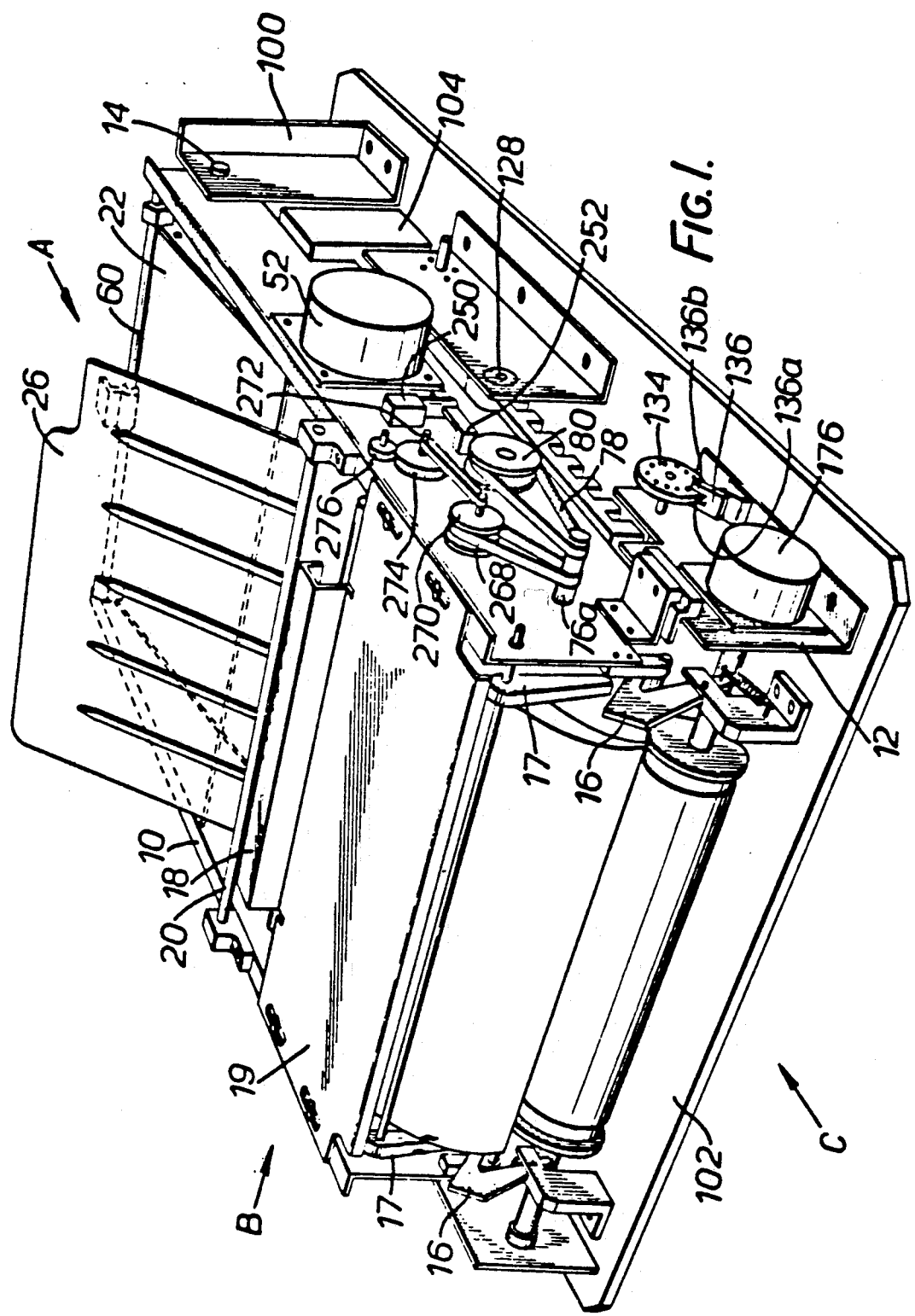
FIG. 1 is a perspective view showing a preferred embodiment of the thermal transfer color printer according to the present invention.

FIG. 1 is a perspective view showing a preferred embodiment of the thermal transfer color printer according to the present invention. The printer consists of upper bracket 10 and lower bracket 12 which are pivotally connected at their rear ends by pivot shaft 14. Upper bracket 10 is usually placed in a horizontal position on lower bracket 12 and is locked to lower bracket 12 by lock 16. Slide handle 18, which projects from sliding plate 19, is slidably mounted on upper bracket 10 to engage grip shaft 20. Upper bracket 10 is unlocked from lower bracket 12 by gripping slide handle 18 and sliding it horizontally towards grip shaft 20, which simultaneously drives lock 16 in the horizontal direction via pivoting levers 17 to unlock upper bracket 10. Upper bracket 10 can be pivoted upward around pivot shaft 14 by lifting slide 18 and grip shaft 20.

A paper container or cassette 22 for containing recording paper 24 is mounted on the upper side of upper bracket 10. A paper tray 26 projects from upper bracket 10 for guiding and holding printed paper exiting from the printer. Recording paper 24 in paper cassette 22 is in the form of cut sheets of plain paper having a predetermined size, for example, $A_4$ size, etc.

Figure 2:
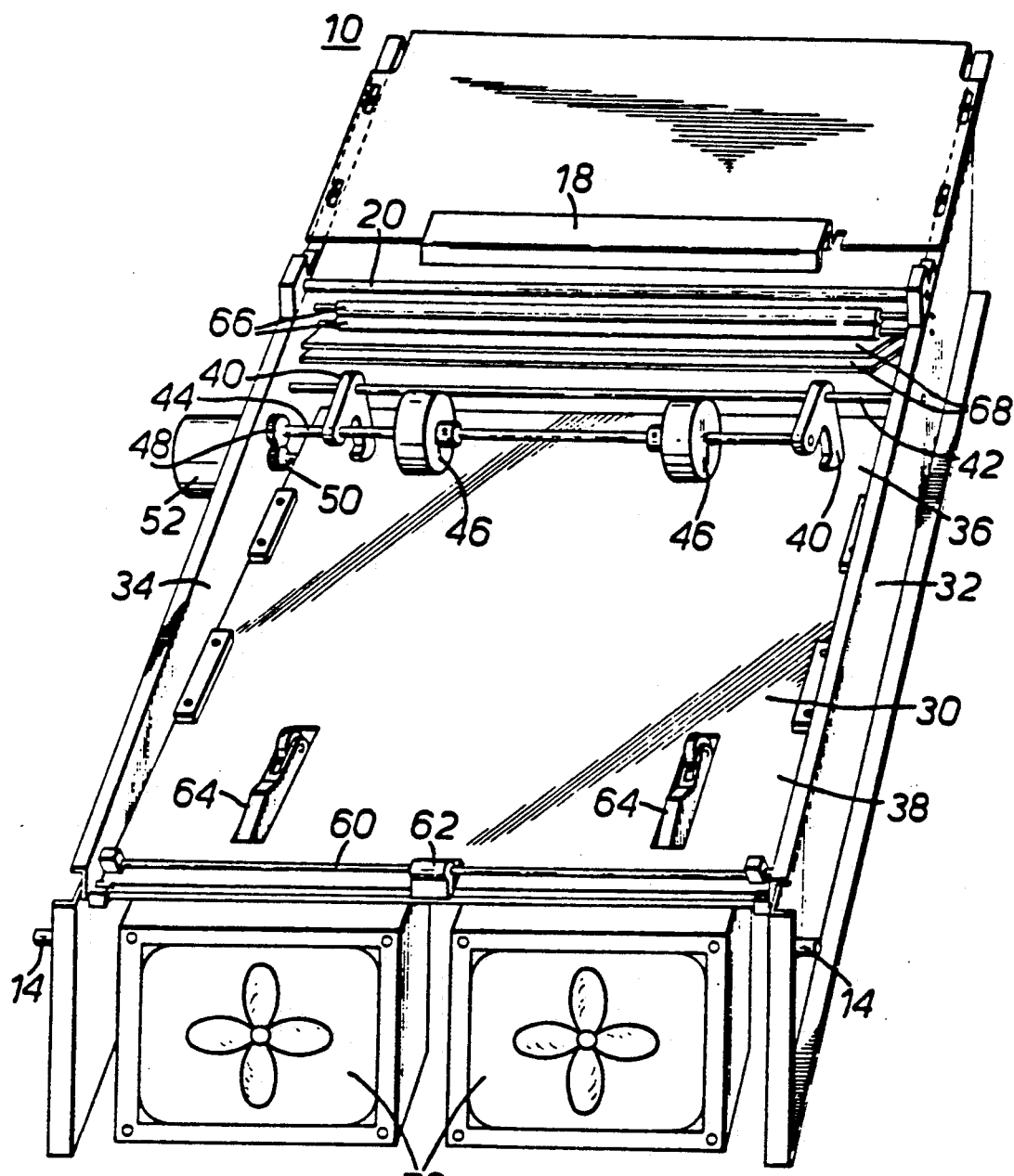
FIG. 2 is a perspective view of the upper side of the upper bracket taken from a direction shown by arrow A in FIG. 1.
Figure 3:
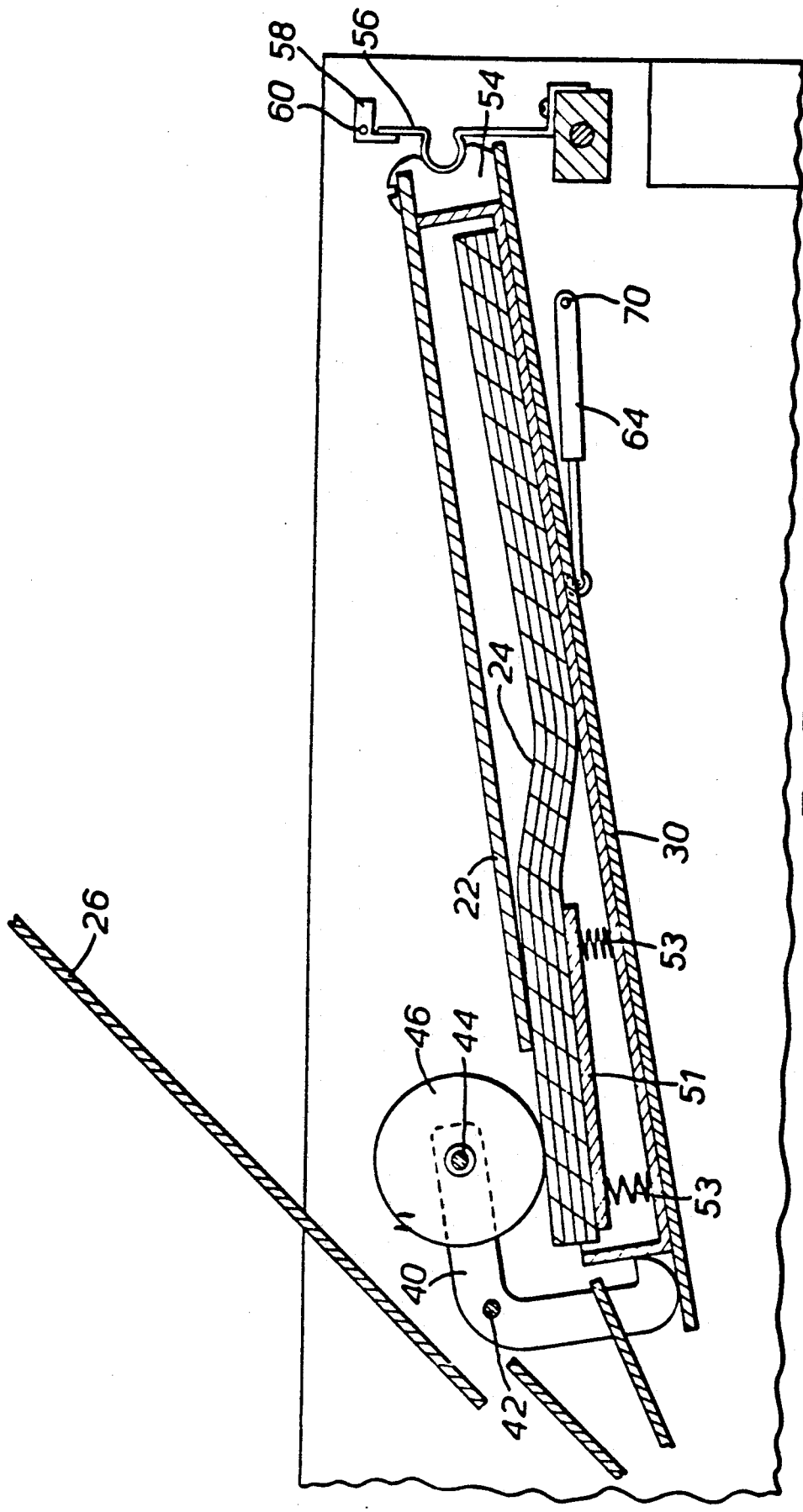
FIG. 3 is a side sectional view showing a cassette for containing separate sheets of recording paper.

FIG. 2 is a perspective view showing the upper side of upper bracket 10 taken from a direction shown by arrow A in FIG. 1. Cassette support plate 30 is provided between side walls 32 and 34. Support plate 30 is positioned so that front portion 36 is lower than rear portion 38. A pair of L-shaped arms 40 are rotatably mounted on support shaft 42 which is supported by side walls 32 and 34 above the front portion of support plate 30. Rotatable shaft 44 is rotatably supported by the upper tips of L-shaped arms 40. A pair of paper feed rollers 46 are mounted on rotatable shaft 44. Gear 48 on one end of rotatable shaft 44 meshes with smaller gear 50 on the inner side of wall 34. Paper cassette 22 pushes the lower tips of L-shaped arms 40 when it sets on supporting plate 30 as shown in FIG. 3. Thus, gear 48 meshes with smaller gear 50 to rotate paper feed rollers 46 which contact individual sheets of recording paper 24 in cassette 22.

Paper lifting plate 51 loaded with springs 53 is mounted on the bottom of paper cassette 22 as shown in FIG. 3. Lifting plate 51 constantly exerts an upward force on paper 24 so that individual sheets of paper are fed out from the cassette one by one by paper feed rollers 46. Projection 54 formed at the rear end of cassette 22 is retained by spring plate 56 having a bent portion which engages projection 54 of cassette 22. Spring plate 56 is disengaged from projection 54 by a pair of pivot arms 58 mounted on rotating shaft 60 supported by side walls 32 and 34. Rotating shaft 60 is rotated by knob 62 mounted on the middle portion of the shaft.

Turning again to FIG. 2, a pair of cassette lifting levers 64 (FIG. 2) extend through cassette support plate 30. Levers 64 normally force the bottom of cassette 22 upward by a spring as explained in further detail below. A pair of paper discharge rollers 66 are rotatably supported by side walls 32 and 34. The recording paper on which the color image is printed is discharged through the pair of discharge rollers 66 from inside the printer. A pair of support plates 68 are provided adjacent discharge rollers 66 for supporting paper tray 26 (FIG. 1) therebetween. Also, as shown in FIG. 2, a pair of fans 70 are provided at the rear end of upper bracket 10 for cooling the inside of the printer.

Figure 4:
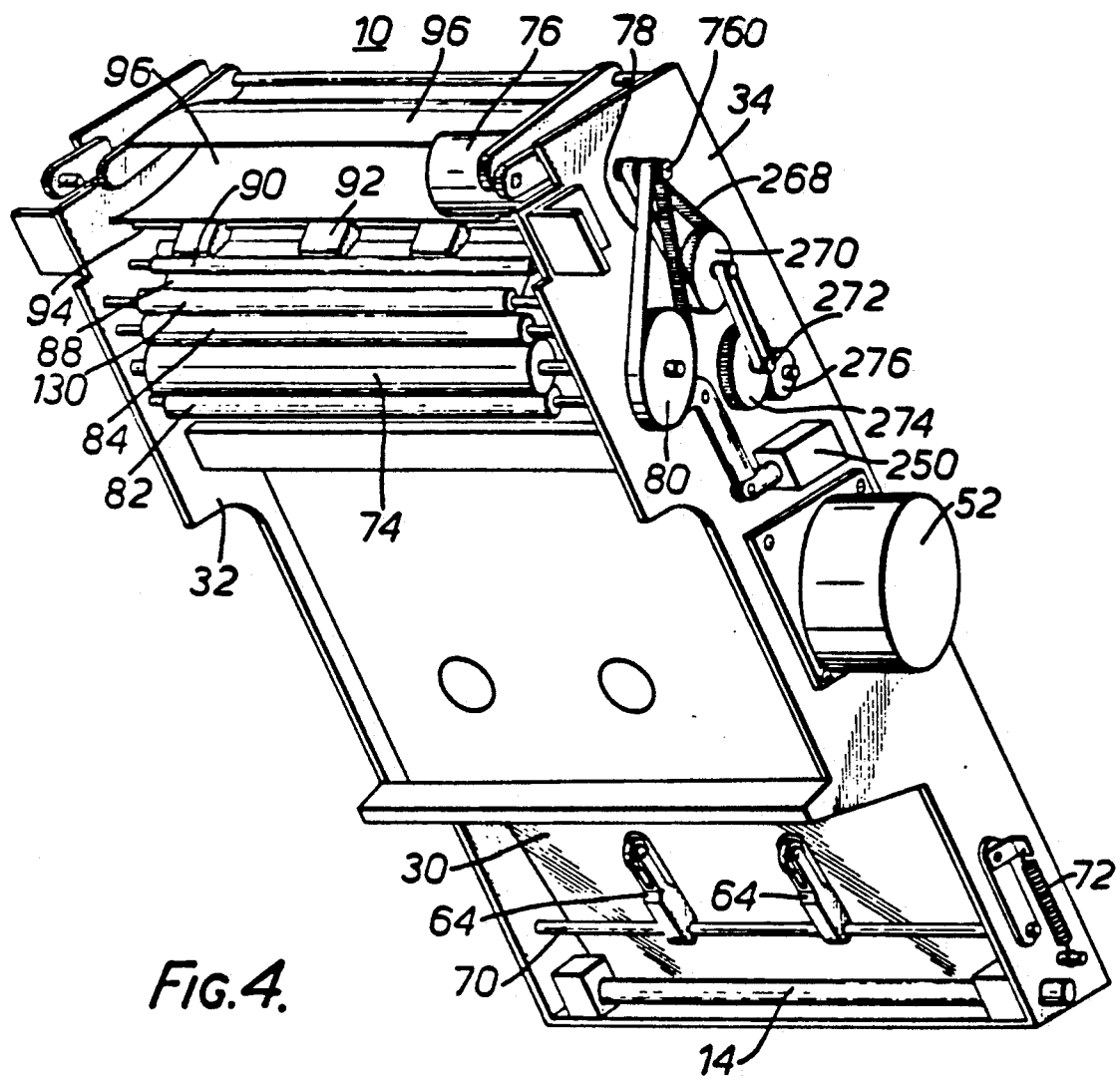
FIG. 4 is a perspective view of the lower side of the upper bracket taken from a direction shown by arrow C in FIG. 1.

FIG. 4 is a perspective view of the lower side of upper bracket 10 taken from the direction shown by arrow C in FIG. 1. Cassette lifting levers 64 are mounted on a rotating shaft 70 below cassette support plate 30. Rotating shaft 70, which is supported by side walls 32 and 34, is driven by spring 72 provided on side wall 34. Spring 72 normally forces cassette lifting levers 64 to rotate so that the upper ends of the levers push the bottom of cassette 22 as shown in FIG. 3. Platen roller 74, which is rotatably supported between side walls 32 and 34 of upper bracket 10, is driven by main motor 76 through toothed timing belt 78 which engages sprocket 80 mounted on an axis of platen roller 74. A pair of pinch rollers, including first entry pinch roller 82 and second exit pinch roller 84, are provided on opposite sides of platen roller 74. These pinch rollers are positioned in contact with the platen roller so that they rotate when platen roller 74 rotates. Guide roller 86 for guiding the ink ribbon is provided in parallel with exit pinch roller 84. Guide plate 88 and guide roller 90 for guiding the recording paper are located higher than exit pinch roller 84. Flappers 92 are mounted on pivot axis 94 for guiding the recording paper from guide roller 90 to one of two different guide paths. A pair of bent guide plates 96 are provided to form one guide path for temporarily receiving the recording paper.

FIG. 5 is a perspective view showing lower bracket 12 according to the invention. A pair of brackets 100 stand upright on bottom plate 102 at the rear end of lower bracket 12 for supporting pivot shaft 14 which in turn supports upper bracket 10. Control circuit 104 for electrically controlling the printer is mounted at the rear end of the lower bracket. Adjacent to the control circuit unit, ink ribbon supply reel 106 is mounted for supplying colored ink ribbon 108 (shown by a dotted line). Reel 106 is rotatably supported by side walls 110 and 112. Guide roller 114 guides ink ribbon 108 supplied from reel 106; guide roller 114 is rotatably supported between side walls 110 and 112 of the lower bracket.

Figure 7:
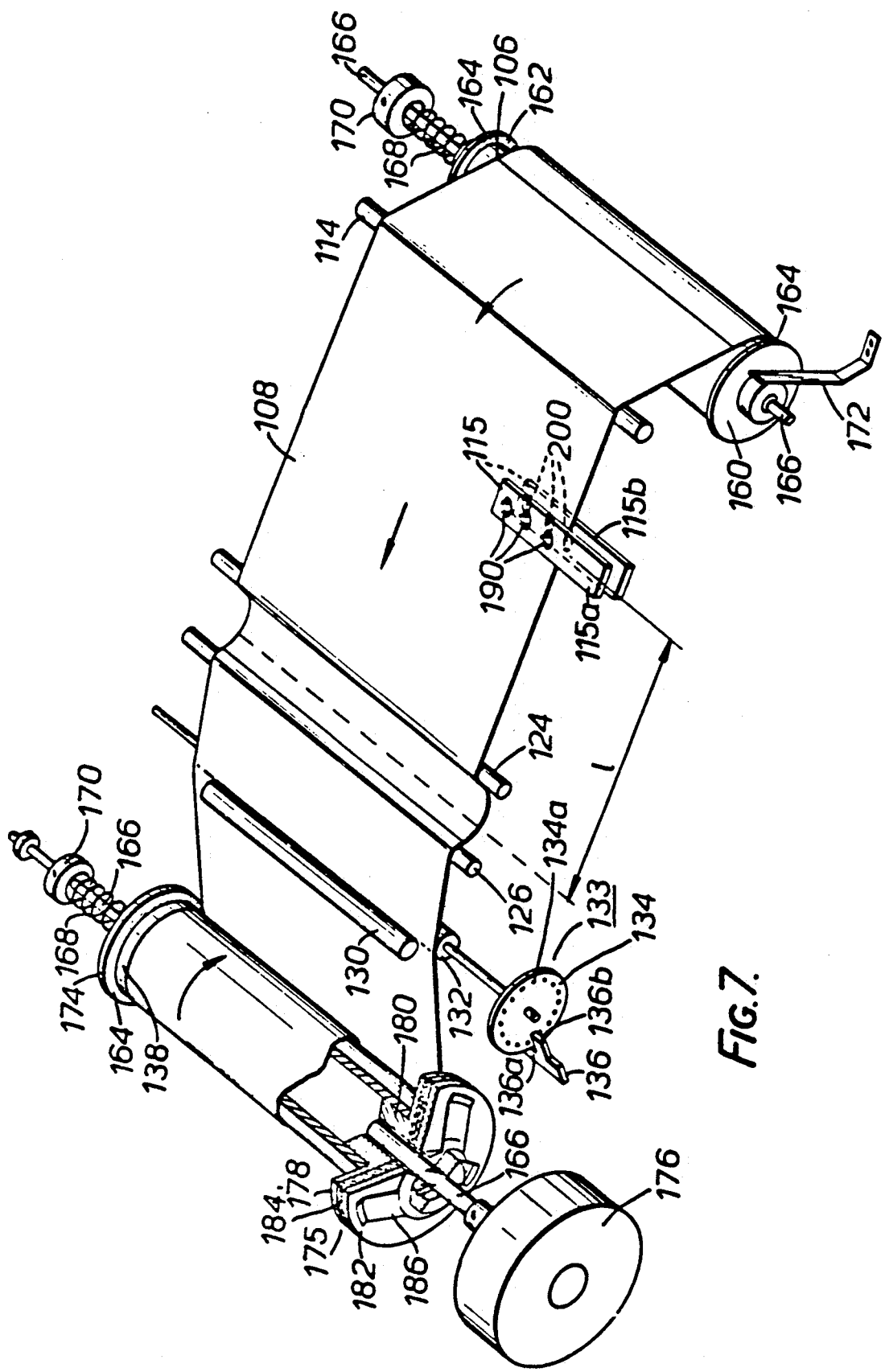
FIG. 7 is a perspective view schematically showing the ink ribbon transportation system according to the present invention.

Color sensor unit 115 for detecting the color of the ink on ink ribbon 108 is provided as shown in FIG. 5. Color sensor unit 115 includes elements 115a and 115b as shown in FIG. 7. Elements 115a and 115b extend from side wall 112 and ribbon 108 passes between these elements. Thermal printhead 116 is located next to the sensor unit. The thermal printhead comprises metal plate 118 having a plurality of heat emitting fins on the undersurface and an array of thermal elements 120 such as resistors formed on the upper surface of the metal plate separated by an insulative layer (not shown). Thermal printhead 116 further comprises drive circuit 122 provided on the upper surface of metal plate 118.

A pair of rollers 124 and 126, one of which is a wrinkle removal roller and the other is a peeling roller respectively, are rotatably mounted on the upper surface of thermal printhead 116. These rollers are arranged in parallel on opposite sides of the array of thermal elements 120. The array of thermal elements 120 and rollers 124, 126 are positioned so that they are brought into contact with the lower surface of platen roller 74 in upper bracket 10 when the upper bracket is closed on the lower bracket. The rear end of thermal printhead 116 is supported on side walls 112 and 114 by pivot pins 128. The front end of the thermal printhead can be moved up and down by a solenoid (not shown) which is explained in further detail below.

Ink ribbon 108 passes through a pair of rollers 130 and 132 mounted on lower bracket 12 as shown in FIG. 5. Distance measuring device 133 is provided adjacent rollers 130 and 132. Device 133 measures the distance that ink ribbon 108 moves. The measuring device comprises disc 134 mounted on one end of lower roller 132 and rotation detector 136. Rotation detector 136 includes light source 136a which transmits light to light receiving device 136b through holes coaxially distributed on disc 134. As ink ribbon 108 passes through rollers 130 and 132, it is rewound on take-up reel 138, which is rotatably supported by side walls 110 and 112 and driven by motor 140.

Figure 6:
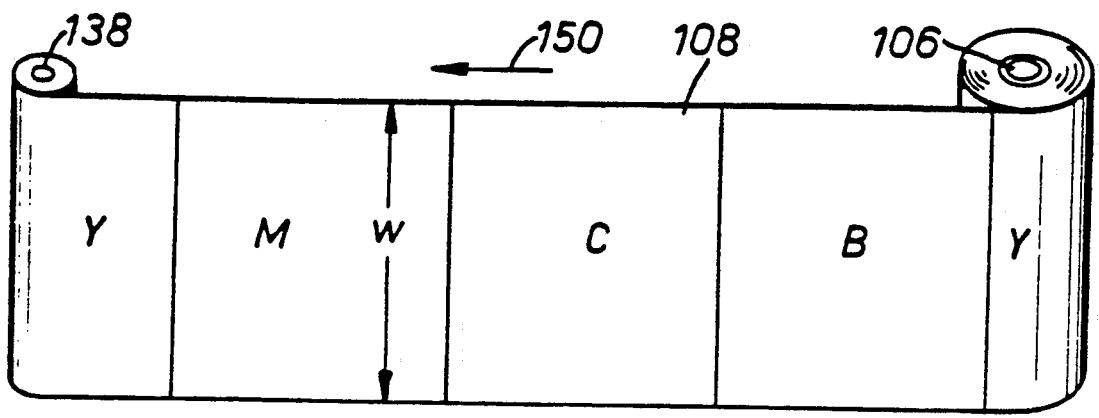
FIG. 6 is a perspective view showing an example of the ink ribbon used in the present invention.

FIG. 6 is a perspective view of an example of the ink ribbon used in the present invention. The ink ribbon has four colored inks coated thereon: yellow (Y), magenta (M), cyan (C) and black (B). Each different color area is arranged alternately and successively along the length of the ribbon. The area of each color is approximately the same as the area of the colored image or picture, for example, if the colored image is $A_4$ size then each colored area on the ink ribbon is $A_4$ size. The different colored inks are coated on base layers made of polyethylene terephthalate film or condenser paper of 3–12 $\mu$m thickness. The thickness of the ink layers is 2–4 $\mu$m, and the ink melting point is preferably 60°–80° C. The ink ribbon, as already explained, is supplied from reel 106 and advanced in the direction shown by arrow 150; the ink ribbon is taken up on reel 138.

The recording paper used in the present invention has a surface which the ink ribbon contacts. The surface smoothness of the surface of the recording paper which contacts the ink ribbon is preferably 300 seconds or more, while the smoothness of the opposite surface of the recording paper is preferably up to 150 seconds. The smoothness of the opposite surface, however, is varied depending on the smoothness of the paper feed rollers shown in FIGS. 2 and 3.

FIG. 7 is a perspective view schematically showing the ink ribbon transportation system according to the invention. Unused ink ribbon 108 is wound on supply reel 106 which includes a pair of reel holders 160 and 162. Each reel holder comprises disc flange 164 and shaft 166 coaxially mounted on flange 164. Shafts 166 are rotatably supported in side walls 110 and 112 shown in FIG. 5. Disc flange 164 of reel holder 160 is pushed against ink ribbon supply reel 106 by coil spring 168; coil spring 168 abuts against stopper 170 mounted on shaft 166. Thus, supply reel 106 is removably supported between the reel holders. Additionally, break device 172 is located on one end of supply reel 106 to provide a frictional force on shaft 166.

The ink ribbon transportation system also includes take-up reel 138. Take-up reel 138 is rotatably supported on one end by reel holder 174 which is substantially of the same construction as reel holder 162 in that it comprises disc flange 164, shaft 166, coil spring 168 and stopper 170. The opposite end of the take-up reel is supported by reel holder means 175 which transmits the rotational force of driving motor 176 to the take-up reel through a friction coupling mechanism. The friction coupling mechanism includes disc flange 178 having annular body 180 projecting therefrom; annular body 180 is loosely mounted on shaft 166 which is in turn driven by motor 176. The annular body of flange 178 is inserted into a bore of cylindrical take-up reel 138 to transmit the rotational force of motor 176 to take-up reel utilizing a key locking device (not shown). The friction coupling mechanism further includes friction disc 182 mounted on shaft 166 to transmit rotational force to flange 178. Friction disc 182 includes felt coat 184 on one end surface facing disc flange 178 and pressing plate 186 on the other end of disc 182. Plate 186 is mounted on shaft 166 so that the rotational force of driving motor 176 can be transmitted to disc flange 178 through pressing plate 186 and frictional disc 182. The above friction coupling mechanism transports the ink ribbon at a constant rate irrespective of changes in the diameter of the ink ribbon wound on the take-up reel. This mechanism and the operation thereof is explained in detail in U.S. patent application Ser. No. 466,046.

Color sensor unit 115 also is shown in greater detail in FIG. 7. One element 115a of color sensor unit 115 contains two or three light sources 190 each emitting different colored light, e.g., yellow, red or green. Light emitting diodes (LED) can be used as such light sources. The other element 115b of color sensor unit 115 contains two or three light receiving devices 200, such as phototransistors, to receive each different colored light emitted from the corresponding light source. The above color sensor unit uses the output signals of light receiving devices 200 to detect the color of the ink on ink ribbon 108 passing through elements 115a and 115b. A detailed explanation of the operation of the color sensor unit in detecting the color of the ink ribbon is given in the above-identified patent application.

FIG. 7 also shows distance measuring device 133 in greater detail. This device measures the distance ink ribbon 108 has traveled by measuring the movement of a pair of rollers 130 and 132. Disc 134 mounted on the axis of roller 132 rotates as ink ribbon 108 passes by the roller. Rotation detector 136 includes light source 136a and light receiving device 136b positioned on opposite sides of disc 134. Light emitted from light source 136a is received through holes 134a of disc 134. The angular distance that disc 134 travels is measured by counting the output pulse signals from light receiving means 136b of rotation detector 136.

Figure 8:
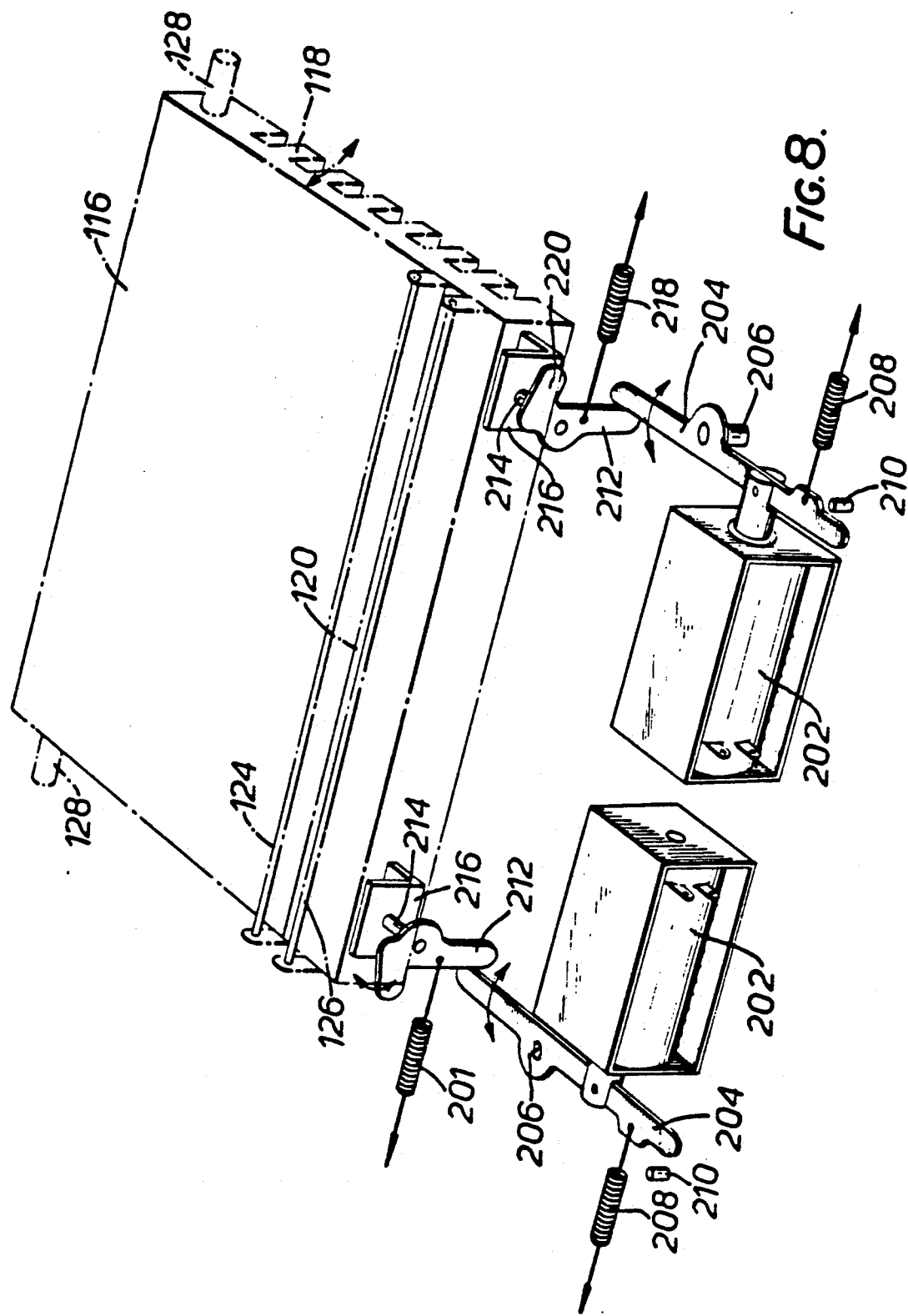
FIG. 8 is a perspective view schematically showing a device for moving the thermal printhead up and down.

FIG. 8 schematically shows a solenoid device for moving thermal printhead 116 up and down to selectively bring the printhead into contact with the platen roller in the upper bracket. A pair of solenoids 202 are mounted on the bottom of the lower bracket. Solenoids 202 are coupled to horizontal lever 204 which is pivotably supported at its center on axis 206 projecting from the bottom of the lower bracket. The horizontal lever is pulled counter clockwise by spring 208 to abut stopper 210. Vertical lever 212 is positioned under the front portion of thermal printhead 116. The center of the vertical lever is pivotably supported by axis 214 projecting from vertical plate 216 mounted on the bottom of the upper bracket. The lower end of vertical lever 212 is pulled counter clockwise by spring 218 to engage one end of horizontal lever 204 to thereby rotate the horizontal lever clockwise. The upper end of vertical lever 212 has a projection 220 which contacts the lower surface of metal plate 188 of the thermal printhead.

The operation of the solenoid device of FIG. 8 is as follows. When solenoids 202 are not energized, horizontal levers 204 are rotated to the limit position defined by stoppers 210. Thus, vertical levers 212 are rotated by the end portion of the horizontal levers and projections 220 are lowered causing the printhead to move downward by its own weight. In this state, a fixed distance of 1-2 mm is left between the upper surface of the thermal printhead and the platen roller. When solenoids 202 are energized, horizontal levers 204 rotate around axes 206 to release vertical levers 212 which rotate by action of springs 218. Projections 220 of the vertical levers then move the printhead in the upward direction so that the upper surface of the thermal printhead is brought into contact with the platen roller.

Figure 9:
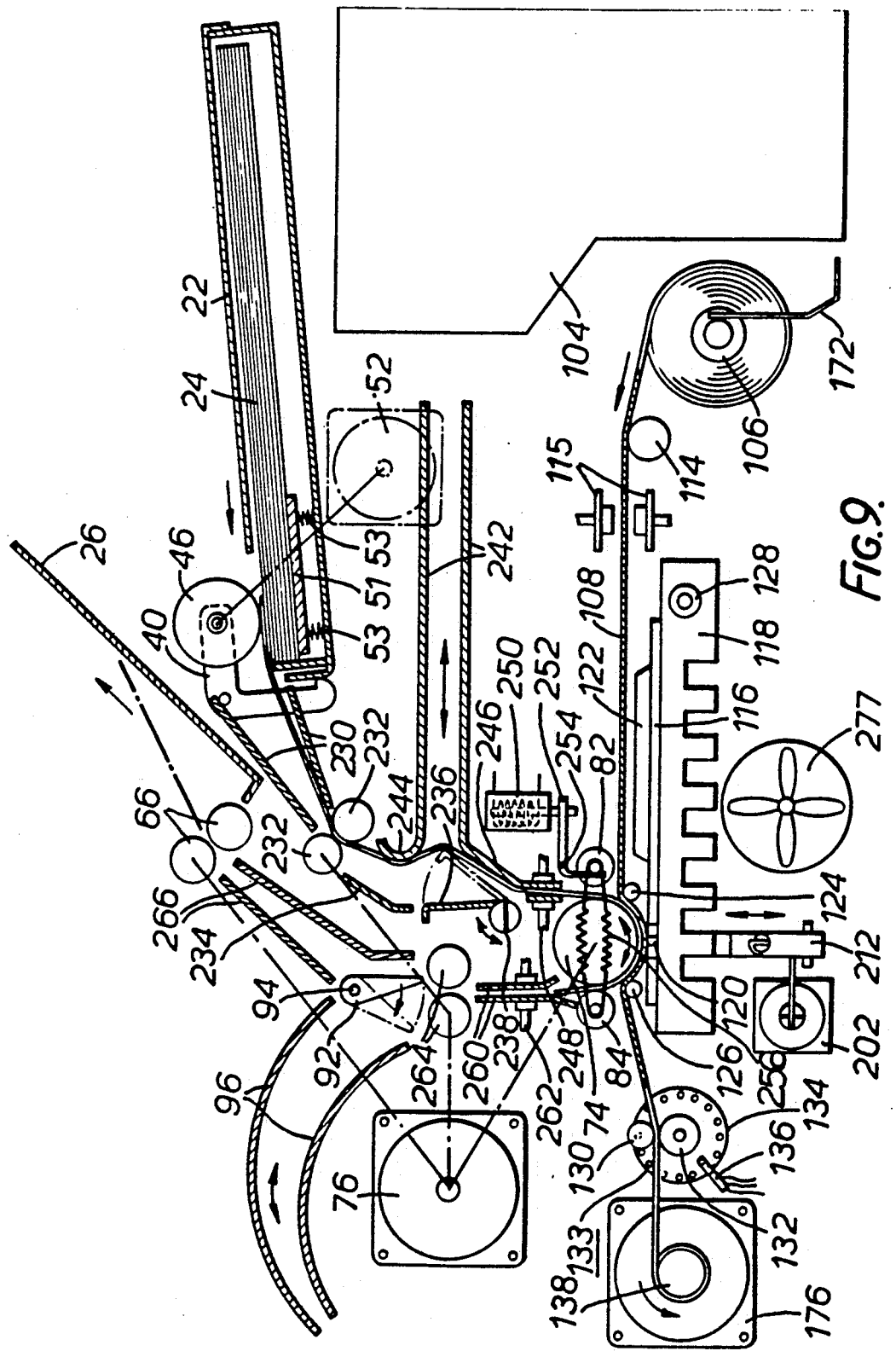
FIG. 9 is a schematic diagram showing the overall thermal transfer color printing system according to the invention.

FIG. 9 is a schematic diagram showing the overall thermal color printing system according to the invention. A pair of paper guide plates 230 are positioned to receive recording paper 24 as it is fed from cassette 22 by paper feed rollers 46. Paper guide plates 230 guide the paper downward in the upper bracket (not shown). At the end of guide plates 230, a pair of first drive rollers 232 are rotatably supported in the upper bracket. Guide plate 234 and first flappers 236 are positioned in the upper bracket to guide recording paper 24 vertically downward to platen roller 74 and entry pinch roller 82.

First flappers 236 are pivotably mounted on pivot pin 238 which is supported in the upper bracket. The pivot pin is rotated by rotary solenoid 239 (FIG. 12) so that the flappers are selectively placed in one of two positions: in a first position, flappers 236 guide the recording paper downward and, in a second position, they push against the recording paper at their round tops. A pair of horizontal paper guide plates 242 are mounted in the upper bracket opposite first flappers 236. The front ends 244 and 246 of guide plates 242 extend upward and downward, respectively, to form part of a return paper guide together with guide plate 234 and first flappers 236. Guide plates 242 provide a return guide path for temporarily receiving paper 24. The entrance of guide plates 242 is located adjacent the round tops of first flappers 236 when these flappers are in their second position as shown by phantom lines 240. At the lower end of lower guide plate 242, optical paper sensor 248 is positioned to detect the recording paper. Sensor 248 includes light emitting and receiving elements placed on opposite sides of the paper path.

Platen roller 74 and a pair of pinch rollers 82, 84 are positioned below optical paper sensor 248. As recording paper 24 passes optical paper sensor 248 and enters the area between platen roller 74 and entry pinch roller 82, the entry pinch roller is pulled back from the platen roller by solenoids 250 mounted on opposite sides of the upper bracket, one side of which is shown in FIG. 1. When solenoid 250, which is coupled to one end of L-shaped arm 252, is energized, it turns arm 252 around pivot shaft 254 which extends across the upper bracket in parallel with entry pinch roller 82. The opposite end of arm 252 engages the shaft of pinch roller 82 to pull roller 82 away from the surface of the platen roller.

Figure 10:
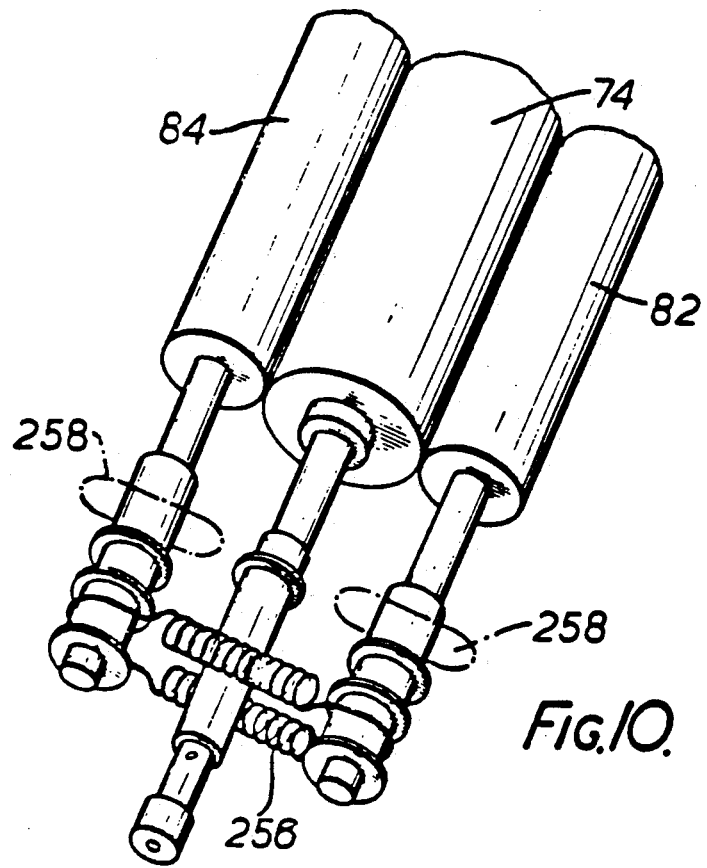
FIG. 10 is a perspective view partly showing the platen roller and a pair of pinch rollers supported adjacent the platen roller to shift toward and away from the platen roller.

Entry pinch roller 82 and exit pinch roller 84 are normally pushed against the surface of platen roller 74 by springs 256 as shown in FIG. 10. Both pinch rollers 82 and 84 are received in horizontally elongated holes 258 on the side walls of the lower bracket so that they can move horizontally along the holes.

Returning to FIG. 9, a pair of vertical guide plates 260 are mounted above and adjacent exit pinch roller 84 and platen roller 74. A second optical paper sensor 262 is mounted on vertical guide plates 260. This sensor, which has substantially the same construction as first sensor 248, detects the passage of recording paper 24 between vertical guide plates 260.

A pair of second drive rollers 264 are provided above guide plates 260 for transporting the paper upward to second flappers 92. The second drive rollers are rotatably supported by the side walls of the upper bracket (not shown). Flappers 92 are pivoted on pivot pins 94 by solenoids 265 (FIG. 13) so that flappers 92 are selectively placed at two positions: in a first position, flappers 92 guide the paper to the left toward bent guide plates 96 and, in a second position (shown by phantom lines), they guide the paper to the right towards a pair of guide plates 266. Guide plates 266 guide the recording paper to exit tray 26 through discharge rollers 66.

First and second drive rollers 232 and 264 and discharge rollers 66 are all driven by common main motor 76. Main motor 76 drives main motor shaft 76a which, as shown in FIG. 1, drives toothed timing belt 268 to transmit rotation to sprocket wheel 270 mounted on second drive rollers 264. The rotation of sprocket wheel 270 is transmitted to shaft 272 of first drive rollers 232. Gear 274, which is mounted on shaft 272, is rotated to drive smaller gear 276 meshed with gear 274. Gear 276 drives discharge rollers 66.

Additionally, FIG. 9 shows the relationship among the above described mechanism for moving the recording paper, thermal printhead 116 and the ink ribbon transportation system. The thermal printhead was described in connection with FIGS. 5 and 8 and the ink ribbon transportation system was described in connection with FIGS. 6 and 7. As further shown in FIG. 9, cooling fan 277 is provided to cool thermal printhead 116.

Figure 13:
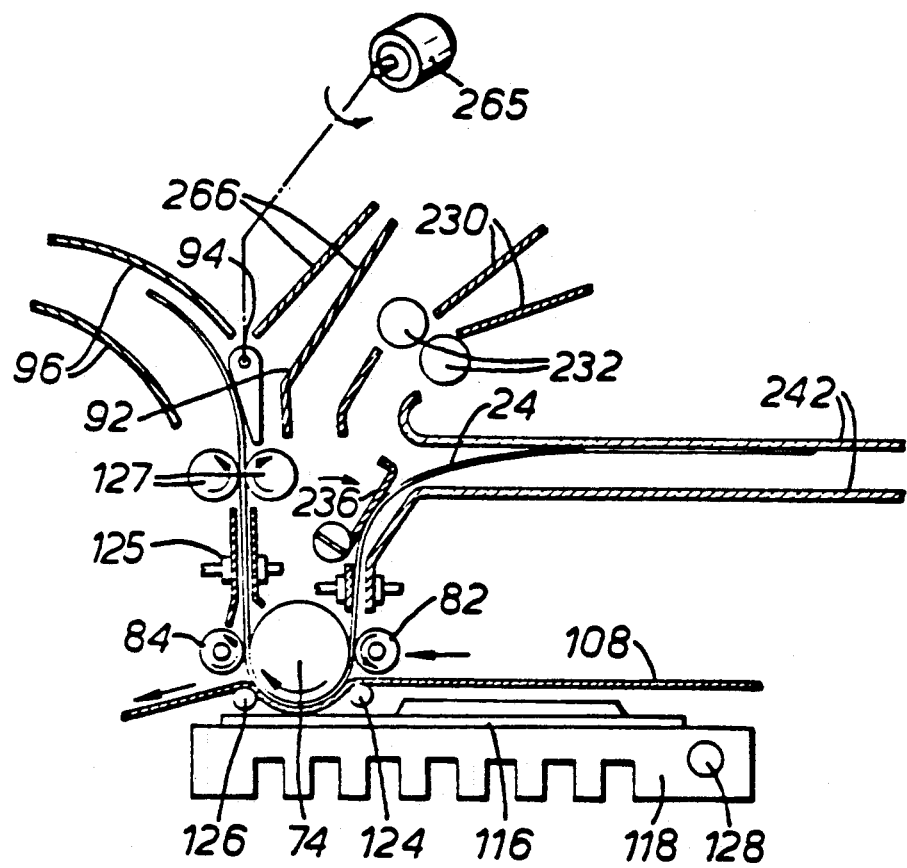
Figure 14:
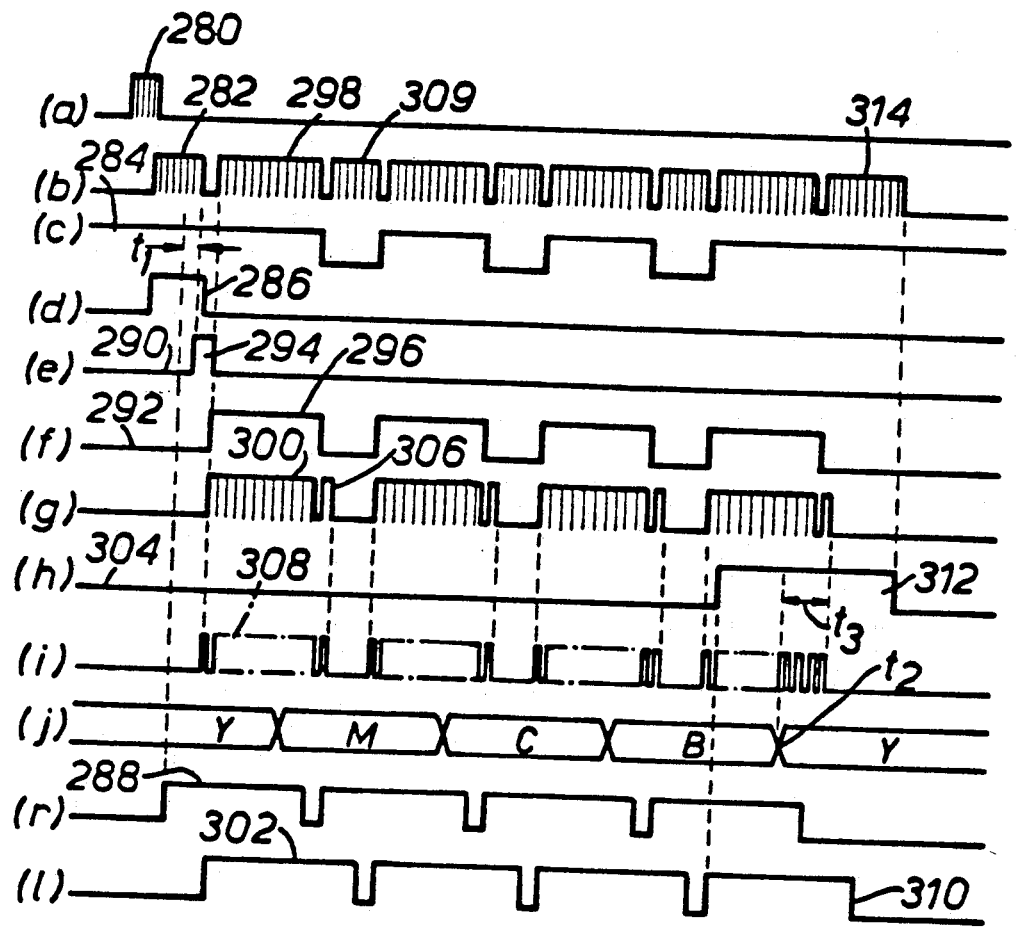
FIG. 14 is a timing diagram showing the timing of various signals for controlling the thermal printer according to the present invention.

The operation of the recording process of the thermal transfer color printer according to the invention will now be explained with reference to FIGS. 9, 11, 12, 13 and 14. FIG. 14 is a timing diagram showing the timing of electric signals supplied to various parts of the printer during the printing process.

When paper cassette 22 is in place and initial preparations for recording have been made, recording paper 24 is removed from cassette 22 one sheet at a time by paper feed rollers 46 which are driven by paper feed motor 52. Motor 52 is driven for a time period determined by pulse signal 280 of FIG. 14(a). Pulse signal 282 of FIG. 14(b) then activates main motor 76 and signal 284 of FIG. 14(c) is simultaneously applied to main motor 76 to indicate the direction of rotation. In this embodiment, a "High" level signal for signal 284 rotates motor 76 in a direction which moves the recording paper forward through first and second drive rollers 232 and 264 and platen roller 74. Thus, a "Low" level signal for signal 284 moves the recording paper in the backward direction. Recording paper 24 is guided by first guide plate 230 into the interior of the apparatus and eventually reaches first drive rollers 232, which are driven by main motor 76. The first drive rollers 232, being coated with rubber, grip and transport recording paper 24 in the forward direction.

Figure 11:
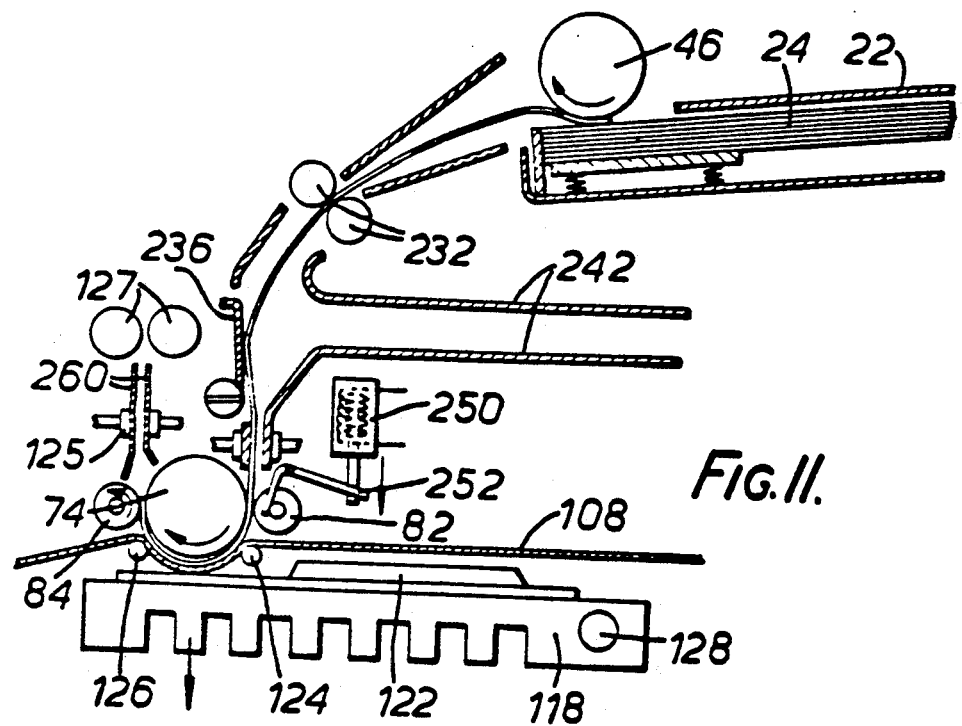
FIGS. 11-13 are schematic diagrams showing the operation of the thermal transfer color printer according to the present invention.

As recording paper 24 advances, it reaches first flappers 236, which are set in their substantially vertical first position in response to solenoid 239. Solenoid 239 is controlled by pulse signal 286 of FIG. 14(d). As the recording paper 24 is transported vertically downward, the front edge of the recording paper is detected by first optical paper sensor 248. When light emitted from sensor 248 is cut off by paper 24, output signal 288 (FIG. 14(k)) of sensor 248 changes from "Low" to "High." Main motor 76 continues to rotate for a fixed time period $t_1$ (FIG. 14(b)) after first optical paper sensor 248 detects the front edge of the recording paper. During this time period, entry pinch roller 82 is in contact with platen roller 74 as shown in FIG. 11, since solenoid 250 is deenergized by "Low" level signal 290 of FIG. 14(e). Further, thermal printhead 116 is not in contact with platen roller 74, i.e., it is not in the "down" state as shown in FIG. 11, since "Low" level signal 292 of FIG. 14(f) is supplied to solenoid 202 (FIG. 8).

The recording paper is forwarded through a space between the lower surface of platen roller 74 and the upper surface of ink ribbon 108 to a position where its front edge has gone slightly past exit pinch roller 84, at which time main motor 76 is stopped. At this moment, 37 High" level signal 294 of FIG. 14(e) is applied to solenoid 250 and entry pinch roller 82 is pulled away from platen roller 74 for a short time period defined by width of the "High" level signal. During this period of time, pulse signal 286 (FIG. 14(d)) falls to a "Low" level thereby causing solenoids 239 to turn first flappers 236 to their second position as shown in FIG. 12.

Figure 12:
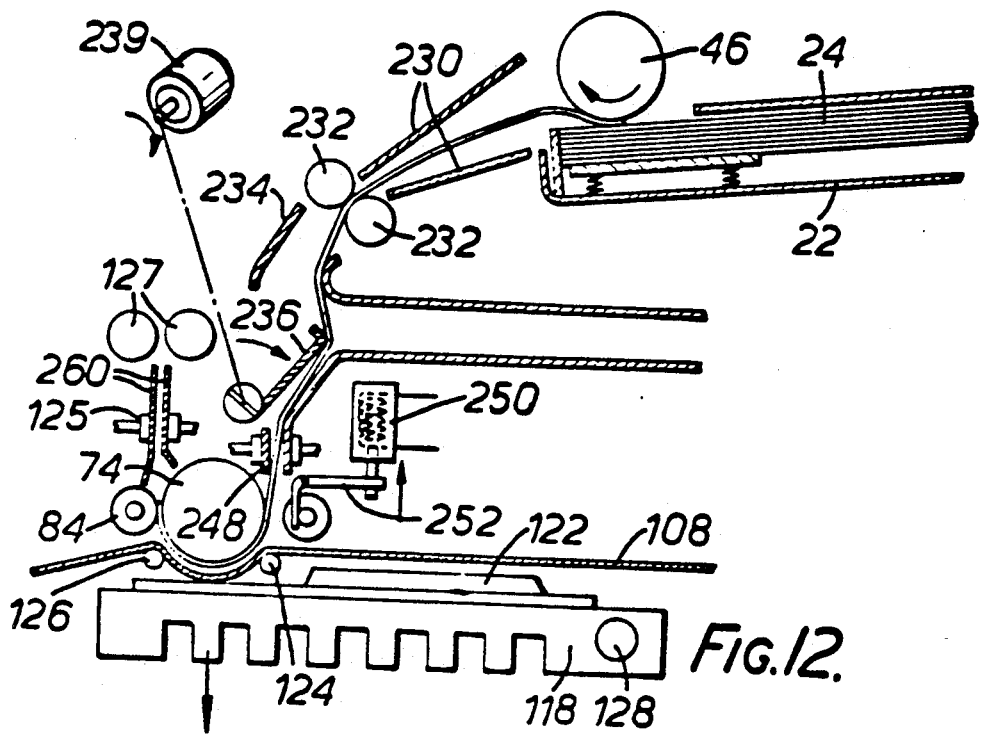

As shown in FIG. 12, first flappers 236 push recording paper 24 against the opening of the horizontal guide path formed by guide plates 242. At this time, the front edge of recording paper 24 is held by platen roller 74 and exit pinch roller 84 and the rear edge of recording paper 24 is held by first drive rollers 232. Therefore, pushing force of the first flappers against the recording paper at an intermediate point results in elimination of slack in the recording paper so that the recording paper is set tightly against the platen roller. This is a very important condition for thermal transfer color printing of high quality.

In the above state of the recording paper, solenoid 250 is deenergized by pulse signal 294 of FIG. 14(e), which changes to a "Low" level, thereby bringing entry pinch roller 82 into contact with platen roller 74. The thermal printing process now moves into the thermal transfer printing stage.

Thermal printhead 116 now is brought into its pressure application state, i.e., it is lifted upward, by applying pulse signal 296 of FIG. 14(f) to solenoid 202. The array of thermal heating elements 120 on the thermal printhead press ink ribbon 108 and recording paper 24 onto the surface of platen roller 74. Main motor 76 and motor 176, the latter of which controls movement of ink ribbon 108, are now actuated by pulse signals 298 of FIG. 14(b) and 300 of FIG. 14(g), respectively, for a predetermined period of time. During this predetermined period of time, one of the color component signals Y is supplied to thermal printhead 116 to selectively energize the thermal heating elements.

Color component signals Y, M, C and B of FIG. 14(j) can be produced by various known techniques. The color component signals of red, green and blue, the principal three colors of light which are generated by a color television camera, can be converted into the principal three painting colors Y, M and C by a color matrix circuit which is well known in the field of color televisions. Another way of obtaining the color component signals is by scanning an original color picture with a laser beam. The reflected laser beam is divided into color components by color filters. Each color component is then converted into an electric signal by a photosensor, such as a CCD device.

When color component signal Y is supplied to printhead 116, ink area Y on ink ribbon 108 is adjacent heating elements 120. FIG. 14(j) shows the timing relationship between the movement of each ink area of different color, as detected by color sensor unit 115 positioned at the rear of thermal printhead 116, and the color component signals. When printhead 116 heats the ink on ink ribbon 108, the ink is softened and transferred onto recording paper 24 in accordance with the image signal. Ink ribbon 108 then is separated from recording paper 24 by roller 126 mounted on printhead 116.

Recording paper 24 continues to move forward and is guided in an upward direction by guide plates 262. While thermal transfer continues, the front edge of the paper is detected by second optical paper sensor 262. Output signal 302 of sensor 262 is shown in FIG. 14(l). One function of this output signal is to detect when the paper is stuck inside the printer. As the recording paper advances toward second flappers 92, it is gripped by a pair of second drive rollers 264. Second flappers 92 are set in their first position as shown in FIG. 13 by solenoid 265, which is supplied with "Low" level signal 304 of FIG. 14(h). Thus, recording paper 24 enters the guide path defined by bent guide plates 96.

While the front edge of recording paper 24 is temporarily received in the guide path defined by bent guide plates 96, its rear end continues to be gripped by entry pinch roller 82 and exit pinch roller 84. Therefore, there is no risk of the recording paper coming out of engagement with the entry and exit pinch rollers on opposite sides of the platen roller.

After enough time has passed to complete the recording of the first color Y, main motor 76 is stopped and thermal printhead 116 is lowered in response to pulse signals 298 and 296 of FIGS. 14(b) and (f), respectively. Output signal 288 (FIG. 14(k)) of first paper sensor 248 now changes to a "Low" level since the rear end of the recording paper has passed the sensor. At this moment, signal 284 of FIG. 14(c) drops to a "Low" level which reverses the main motor.

Ink ribbon take-up motor 176 is also stopped when the main motor is stopped. However, motor 176 is immediately actuated again by short pulse signal 306 of FIG. 14(g). During the short period of time defined by the pulse width of signal 306, ink ribbon 108 moves forward until the front edge of the next colored ink area M (FIG. 6) comes over thermal heating elements 120 of thermal printhead 116 for the next printing cycle.

Movement of ink ribbon 108 is also controlled by output pulse signal 308 of FIG. 14(j), which is generated by distance measuring device 133. The number of pulses output from distance measuring device 133 is proportional to the distance which ink ribbon 108 is advanced by take-up motor 176. When take-up motor 176 starts moving, simultaneously main motor 76 starts moving in its reverse direction. Platen roller 74 reverses rotation so that recording paper 24 moves backward. The speed of this backward movement of the recording paper preferably is faster than forward movement as described in further detail in U.S. patent application Ser. No. 466,046. During backward movement of recording paper 24, first flappers 236 are positioned in their second position so that the rear edge of the paper is temporarily received in the horizontal guide path defined by guide plates 242 as shown in FIG. 13. The front edge of recording paper 24 is again brought into a recording start position as mentioned above. When the recording paper is in this position, output signal 302 (FIG. 14(l)) of second paper sensor 262 drops to a "Low" level and output signal 288 (FIG. 14(k)) of first paper sensor 248 again rises to a "High" level. Main motor 76 then is de-energized by pulse signal 309 (FIG. 14(b)) and signal 284 (FIG. 14(c)) again goes "High" to begin another forward movement of the recording paper and the ink ribbon.

This completes the first step or cycle of the printing process, i.e., the printing of the first color component. The second step or cycle of the printing process, i.e., printing the second color component, is now ready. The same printing steps are repeated three times for superimposing printing images of other different colors, e.g., magenta, cyan and black, on the same recording paper.

In the last printing step or cycle for the black color component, at the moment the front edge of the recording paper is detected by second optical paper sensor 262, second flappers 92 are switched over to their second position shown by phantom lines in FIG. 9. Flappers 92 are controlled by pulse signals 310 and 312 of FIGS. 14(l) and (h). Recording paper 24 is forwarded along guide plates 266 while printing of the black color component is carried out. The recording paper exits the interior of the apparatus and is removed to paper tray 26 by discharge rollers 66. Pulse signal 312 for driving second flappers 92 then drops to a "Low" level to return flappers 92 to their first position. At the same time, pulse signal 314 for driving main motor 76 drops to "Low" to stop the main motor and complete all the steps for printing a color image on the recording paper.

Figure 15:
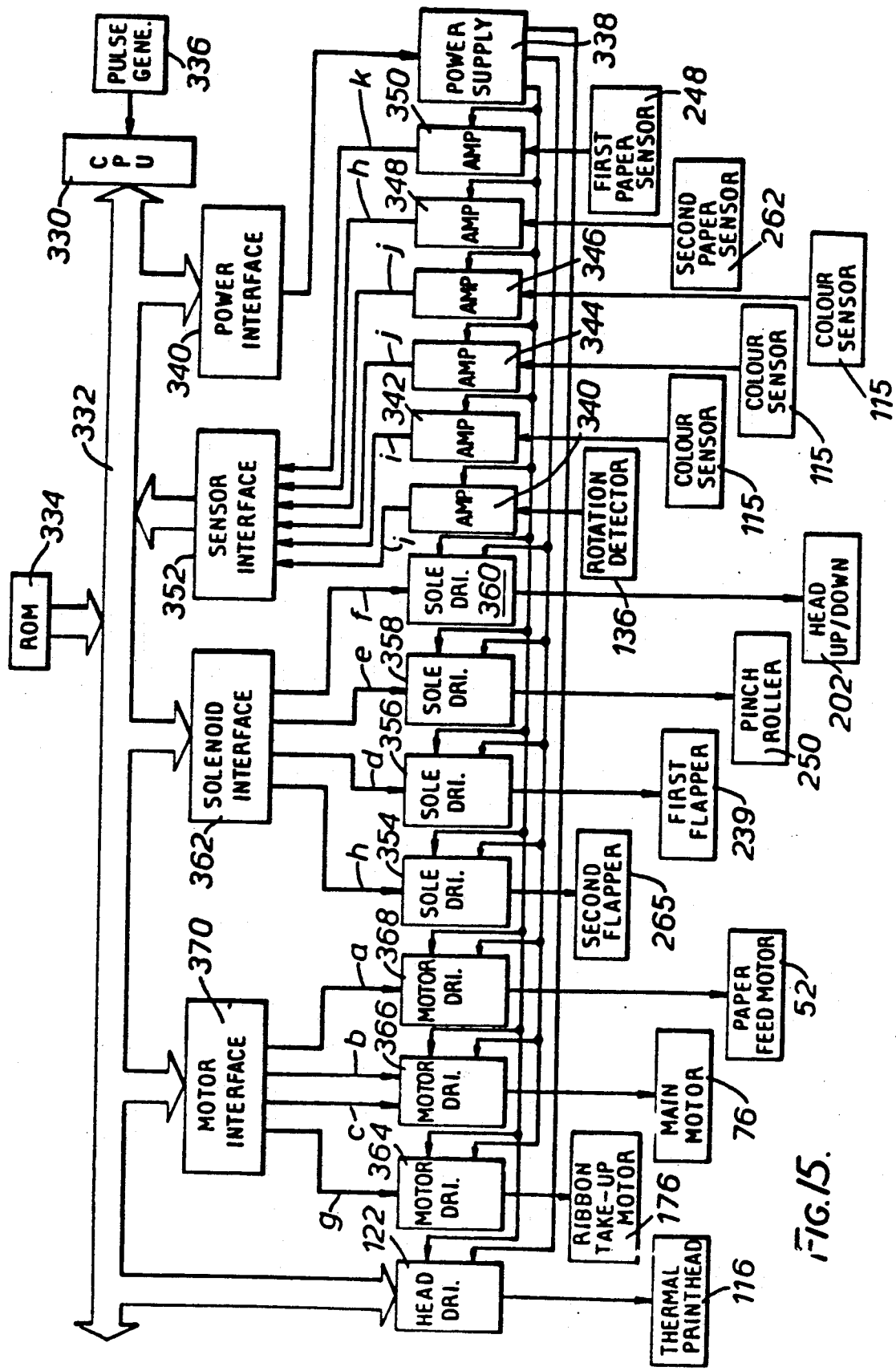
FIG. 15 is a block diagram showing a control circuit for controlling the thermal printer according to the present invention.

FIG. 15 is a block diagram showing the electrical circuit for controlling the printer in the manner described above in connection with the timing diagram of FIG. 14. This circuit includes CPU 330, such as a microcomputer, for controlling the entire circuit. Bus line 332 transmits data signals to and from CPU 330. Read only memory (ROM) 334 is connected to bus line 330 for storing a program for controlling CPU 330. Pulse generator 336 is connected to CPU 330 to supply clock pulses thereto and power supply 338 is connected to bus line 332 through power interface 340 to provide power to the electrical circuit.

Amplifiers 340-350 amplify output signals provided by rotation detector 136, color sensors 115 for ink ribbon 108, first paper sensor 262 and second paper sensor 248. The output signals i, j, h and k (shown in FIG. 14) of these amplifiers are supplied to bus line 332 and CPU 330 through sensor interface unit 352.

Solenoid drive circuits 354-360 supply drive signals to solenoids 265 and 239 for flappers 92 and 236, solenoid 250 for shifting pinch roller 82 and solenoid 202 for moving printhead 116 up and down. Control signals h, d, e and f (shown in FIG. 14) are supplied to each solenoid drive circuit 354-360 from CPU 330 through bus line 332 and solenoid interface unit 362.

Motor drive circuits 364-368 drive ribbon take-up motor 176, main motor 76 and paper feed motor 52. Control signals g, c, b and a (shown in FIG. 14) are supplied to each drive circuit 364-368 from CPU 330 through bus line 332 and motor interface unit 370. A control signal also is supplied from CPU 330 to a known thermal printhead drive circuit 122 which drives thermal printhead 116.

Power supply 338 supplies three different voltages, e.g., 5, 24 and 9 volts, to its output lines 372-376. The first output voltage, 5 volts, is supplied to all the amplifiers, solenoid drive circuits, motor drive circuits and the thermal printhead drive circuit to drive TTL logic circuits included therein. The second output voltage, 24 volts, is supplied to all the solenoid drive circuits and motor drive circuits to drive the solenoids and motors. The third output voltage, 9 volts, is supplied to thermal printhead drive circuit 122 for selectively energizing the thermal or heating elements thereof.

CPU 330 is responsive to the program stored in ROM 334 to generate the control pulse signals shown in FIG. 14 and derive these control pulse signals from the output of pulse generator 336. The program controlled CPU controls the operation of all drive circuits at times corresponding to the timing diagram of FIG. 14 and it receives input signals from the sensors shown in FIG. 15 monitoring the operation of the printer. The CPU generally operates in response to the stored program in ROM 334 to control the overall operation of the printer in the manner described above in connection with FIGS. 9 and 11-14.

While multicolored recording is being carried out by the thermal transfer recording process described above, blurring due to inaccurate superimposing of different color images during the recording process must be prevented. In the printer of the present invention, the ink ribbon is transported in a first or forward direction by a drive mechanism including supply reel 106 coupled to break device 172 and take-up reel 138 driven by driving motor 176. This ink ribbon transportation system causes a certain amount of tension along the ink ribbon. This tension is great enough to provide a guide surface for guiding the recording paper along the surface of the platen roller.

Figure 16:
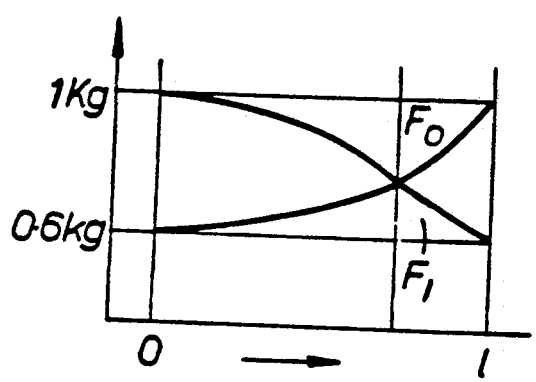
FIGS. 16 and 17 are graphs showing the variations in tension forces $F_1$, $F_o$ and $F_p$ when the length l of the ink ribbon varies.

The tension along the ink ribbon is represented as the difference between the forward tension force $F_1$ caused by the wind-up action of the take-up reel and the back tension force $F_0$ caused by the breaking action of the supply reel as shown in FIG. 16. It has been found by experiment that the values of these tension forces $F_1$ and $F_0$ are a function of the length l of the ink ribbon transmitted from the supply reel to the take-up reel as shown in FIG. 16. As shown therein, $F_1$ gradually decreases as length l increases, whereas $F_0$, which is initially smaller than $F_1$, gradually increases until it exceeds $F_1$. This phenomenon takes place because the diameters of the ink ribbon wound on the supply reel and take-up reel change during transportation of the ink ribbon from the supply reel to the take-up reel, which results in changes in the torque force.

The tension forces $F_1$ and $F_0$ on the ink ribbon effect the rotation rate of the platen roller in such a way that if $F_1$ is larger than $F_0$ ($F_1 > F_0$), the rotation rate of the platen roller is increased, which then results in an unfavorable increase in the transportation of recording paper. On the other hand, if $F_1$ is smaller than $F_0$ ($F_1 < F_0$), the opposite result is achieved. The tension force F transmitted to the recording paper is expressed as follows:

$$F = F_p + (F_1 - F_0) \tag{1}$$

where $F_p$ is the tension force exerted by the platen roller on the recording paper. This force F, which is plotted in FIG. 17, gradually decreases as more of the ink ribbon is used. Thus, the rate of transportation of the recording paper in the first or forward direction gradually decreases as the ink ribbon is used, while the rate of transportation of the recording paper in the second or reverse direction is not affected by the ink ribbon since the thermal printhead is in the down or disengaged state.

The above differences in the transportation rate of the recording paper causes an undesirable displacement of the dots of different color to be superimposed on the recording paper from the ink ribbon. This undesirable effect is resolved in the present invention by a control system for the drive motor for the platen roller as shown in FIG. 18.

Figure 18:
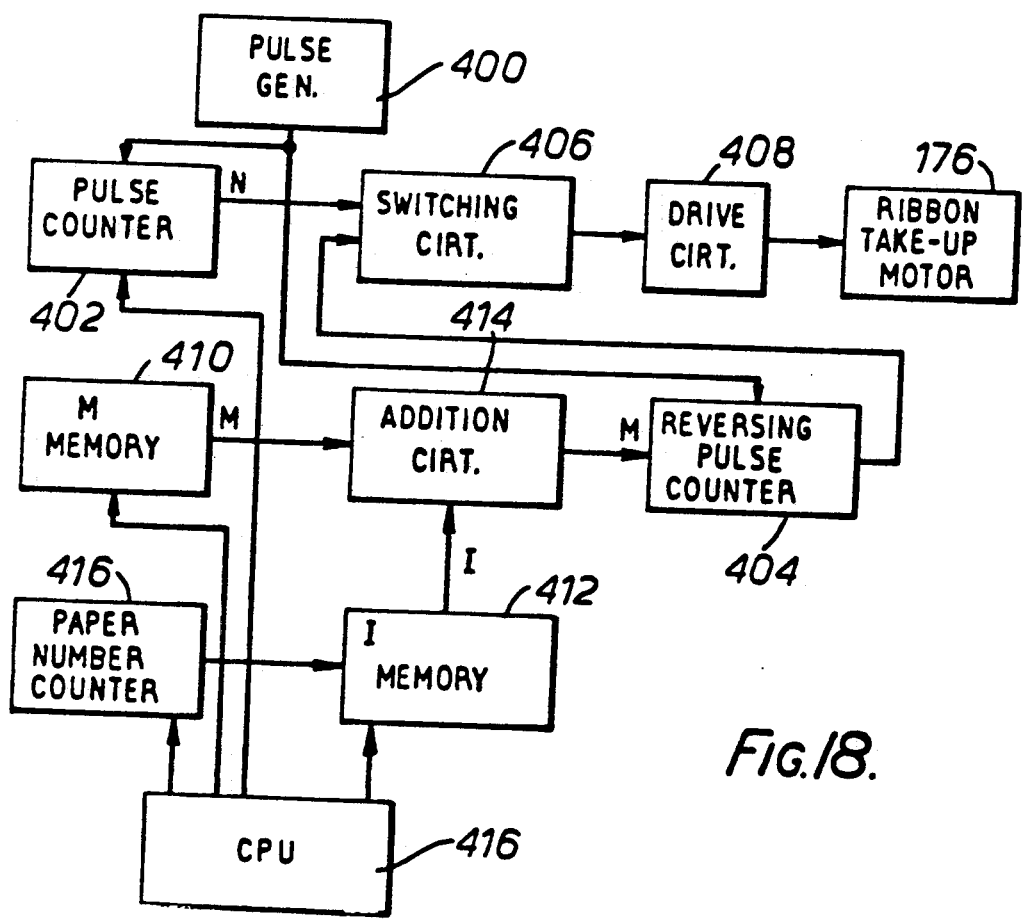
FIG. 18 is a block diagram of a control circuit for controlling the ink ribbon take-up motor.

The control system of FIG. 18 includes pulse generator 400 which generates pulses supplied to advance pulse counter 402 and reverse pulse counter 404, both of which are ultimately controlled by operation of CPU 416. Counters 402 and 404 generate a predetermined number of pulses at their output terminals. The output pulses of counters 402 and 404 are selectively switched by switching circuit 406 and supplied to drive circuit 408. Drive circuit 408 drives take-up motor 176, which is a pulse motor for driving the take-up reel.

The mechanism for determining the number of pulses generated by reverse pulse counter 404 will now be described. The number of sheets of recording paper printed by the thermal printer for a particular roll of ink ribbon is counted by paper number counter 416. This paper number counter may be responsive to signals from the first and second optical paper sensors 248 and 262 (FIG. 9) or it may be responsive to the CPU program which effects the overall movement of recording paper in the printer. Paper number counter 416 operates in conjunction with memory 412 to generate a correction value I which is directly related to the number of printed sheets of recording paper. For example, correction value I may be a positive or a negative value which changes for each 5 to 10 printed sheets of recording paper. This correction value I is added to a predetermined number M in addition circuit 414. The predetermined number M, which is stored in memory 410, corresponds to the number of output pulses generated by reverse pulse counter 404 in the previous printing cycle. The sum of correction value I and predetermined number M results in a new predetermined number M' which is supplied to reverse pulse counter 404 by addition circuit 414. Reverse counter 404 then supplies M' reverse pulses to switching circuit 406.

Figure 17:
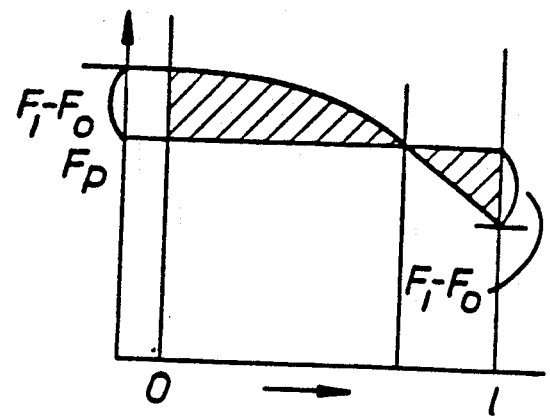

As shown in FIG. 17, when the number of printed sheets of paper is small, the force acting on the recording paper is greater than force $F_p$ so that the recording paper advances too far. Therefore, the correction value I is made positive ($I > 0$), which causes an increase in the number of reverse pulses to thereby increase the amount of recording paper returned. On the other hand, when the number of printed sheets of recording paper is large, the used length of the ink ribbon increases. As shown in FIG. 16, the force acting on the recording paper then is smaller than the force $F_p$ so that the recording paper does not advance far enough. Therefore, the correction value I is now made negative ($I < 0$), which causes a decrease in the number of reverse pulses to thereby decrease the amount of recording paper returned.

Although an illustrative embodiment of the present invention has been described in detail with reference to the accompanying drawings, it is to be understood that the invention is not limited to the precise embodiment described herein. Various changes and modifications may be effected in the above described embodiment without departing from the scope or spirit of the present invention.

We claim:

1. A thermal transfer color printer for printing a color image on individual separate sheets of a recording media having front and rear end portions comprising:

feed means for feeding separate sheets of a recording media one by one into said thermal transfer color printer;

a reversible platen roller to transport a single sheet of recording media received from said feed means;

retention means adjacent said reversible platen roller for retaining and guiding the sheet of recording media along the surface of said platen roller as the sheet of recording media moves in both a first and reverse direction during printing of a color image;

a multicolored ink ribbon supported to move across said platen roller with one face of said ink ribbon in heat transfer relationship with the sheet of recording media, said ink ribbon having a plurality of color segments successively arranged along its length;

a thermal printhead having thermal elements which are selectively energized by color component electrical signals representing the color image to be printed on the sheet of recording media, said printhead being positioned with said thermal elements facing the surface of said platen roller in heat transfer relatioship with said multicolored ink ribbons;

printhead moving means for selectively moving said thermal printhead up and down so that in the up state said printhead presses said ink ribbon and said sheet of recording media onto the surface of said reversible platen roller for thermally transferring colored ink from said ink ribbon onto said sheet of recording media when said thermal elements are energized and in the down state said printhead is disengaged from said reversible platen roller;

ink ribbon drive means for transporting said multicolored ink ribbon in said first direction;

platen roller drive means for driving said reversible platen roller to transport the sheet of recording media in said first direction without disengaging said retention means from the rear end portion of the sheet of recording media, said platen roller drive means transporting the sheet of recording media at substantially the same rate as said ink ribbon, said platen roller drive means also including reverse drive means for driving said reversible platen roller in said reverse direction to transport the sheet of recording media in a second direction opposite said first direction without disengaging said retention means from the front end portion of the sheet of recording media, wherein said platen roller drive means includes means to prevent said sheet of recording media from exiting said printer during printing of said color image on said recording media; and electrical circuit means connected to said thermal printhead for supplying the color component electrical signals to said thermal elements while the sheet of recording media is transported in the first direction.

2. A thermal transfer color printer according to claim 1 further including path selection means for guiding said sheet of recording medium from said platen roller to a paper tray arranged at a position outside said thermal transfer color printer after printing said color image, said path selection means preventing said sheet of recording medium from entering said paper tray during printing of said color image on said sheet of recording medium.

3. A thermal transfer color printer for printing a color image on individual separate sheets of a recording medium comprising:

feed means for feeding separate sheets of a recording medium one-by-one into said thermal transfer color printer;

a platen roller to transport a single sheet of recording medium received from said feed means;

a multicolored ink ribbon supported to move across said platen roller with one face of said ink ribbon in heat transfer relationship with the sheet of recording medium, said ink ribbon having a plurality of color segments successively arranged along its length;

a thermal printhead having thermal elements which are selectively energized by color component electrical signals representing the color image to be printed on the sheet of recording medium, said printhead being positioned with said thermal elements facing the surface of said platen roller in heat transfer relationship with said multicolored ink ribbon;

ink ribbon drive means for transporting said multicolored ink ribbon in a first direction;

platen roller drive means for driving said platen roller to load the sheet of recording medium at an initial position for printing and to transport it at substantially the same rate as said ink ribbon in said first direction for printing one color segment of the multicolored ink ribbon, said platen roller drive means further transporting said sheet of recording medium to said initial position again for printing the next color segment of the multicolored ink ribbon after said printing of one color segment of the multicolored ink ribbon;

path selection means for guiding said sheet of recording medium from said platen roller to a paper tray arranged at a position outside said thermal transfer color printer after printing said color image, said path selection means preventing said sheet of recording medium from entering said paper tray during printing of said color image on said sheet of recording medium; and electrical circuit means connected to said thermal printhead for supplying the color component electrical signals to said thermal elements while the sheet of recording medium is transported in the first direction.

* * * * *